United States Patent
Tamori

(10) Patent No.: US 12,151,677 B2
(45) Date of Patent: Nov. 26, 2024

(54) VEHICLE CONTROL DEVICE, VEHICLE CONTROL METHOD, PROGRAM, AND VEHICLE

(71) Applicant: Sony Group Corporation, Tokyo (JP)

(72) Inventor: Masahiro Tamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 537 days.

(21) Appl. No.: 17/293,919

(22) PCT Filed: Dec. 6, 2019

(86) PCT No.: PCT/JP2019/047763
§ 371 (c)(1),
(2) Date: May 14, 2021

(87) PCT Pub. No.: WO2020/129687
PCT Pub. Date: Jun. 25, 2020

(65) Prior Publication Data
US 2022/0017093 A1    Jan. 20, 2022

(30) Foreign Application Priority Data

Dec. 20, 2018 (JP) .................................. 2018-237945

(51) Int. Cl.
*B60W 30/095* (2012.01)
*B60Q 1/46* (2006.01)
(Continued)

(52) U.S. Cl.
CPC ............. *B60W 30/095* (2013.01); *B60Q 1/46* (2013.01); *B60Q 1/507* (2022.05);
(Continued)

(58) Field of Classification Search
CPC ................ B60W 60/001; B60W 1/46; B60W 30/18154; B60W 2555/60;
(Continued)

(56) References Cited

U.S. PATENT DOCUMENTS 7,315,235 B1 * 1/2008 Fairchild .................. B60Q 1/50
340/556
8,537,030 B2 * 9/2013 Perkins .................. G08G 1/166
340/474
(Continued)

FOREIGN PATENT DOCUMENTS

| CN | 104527640 A | 4/2015 |
| CN | 107808549 A | 3/2018 |

(Continued)

OTHER PUBLICATIONS

International Search Report and Written Opinion mailed on Feb. 18, 2020, received for PCT Application PCT/JP2019/047763, Filed on Dec. 6, 2019, 11 pages including English Translation.

*Primary Examiner* — Luis A Martinez Borrero
(74) *Attorney, Agent, or Firm* — XSENSUS LLP

(57) ABSTRACT

A vehicle control device includes a notification control unit that controls a notification to surroundings in a case where a vehicle moves from a parking position and an operation control unit that automatically moves the vehicle from the parking position to make the vehicle join a vehicle traffic region and temporarily stops the vehicle before the vehicle enters the vehicle traffic region. The present technology is applied to, for example, a vehicle that automatically drives.

20 Claims, 10 Drawing Sheets

(51) Int. Cl.
*B60Q 1/50* (2006.01)
*B60W 30/18* (2012.01)
*B60W 60/00* (2020.01)

(52) U.S. Cl.
CPC .... *B60W 30/18154* (2013.01); *B60W 60/001* (2020.02); *B60W 2552/10* (2020.02); *B60W 2552/45* (2020.02); *B60W 2554/406* (2020.02); *B60W 2555/60* (2020.02)

(58) Field of Classification Search
CPC ....... B60W 2554/406; B60W 2552/45; B60W 2552/10; B60Q 1/46; B60Q 1/507
See application file for complete search history.

(56) References Cited

U.S. PATENT DOCUMENTS

| | | | | |
|---|---|---|---|---|
| 8,560,175 | B2* | 10/2013 | Bammert | B62D 15/028 701/41 |
| 8,665,081 | B2* | 3/2014 | Yoshino | B60Q 9/00 340/463 |
| 9,481,368 | B2* | 11/2016 | Tomozawa | B60W 30/06 |
| 9,751,562 | B2* | 9/2017 | Yamashita | B62D 15/027 |
| 10,048,698 | B2* | 8/2018 | Nordbruch | G05D 1/0212 |
| 10,134,280 | B1* | 11/2018 | You | B60Q 1/525 |
| 10,268,899 | B2* | 4/2019 | Cai | G08G 1/0116 |
| 10,293,822 | B1* | 5/2019 | Silver | G06V 20/58 |
| 10,325,502 | B2* | 6/2019 | Colella | B60W 10/20 |
| 10,377,376 | B2* | 8/2019 | Diedrich | B60W 30/0953 |
| 10,384,675 | B2* | 8/2019 | Alarcon | B60W 10/04 |
| 10,525,974 | B2* | 1/2020 | Nakada | G06V 20/586 |
| 10,689,875 | B2* | 6/2020 | Maier | E04H 6/424 |
| 10,741,080 | B2* | 8/2020 | Nordbruch | B60W 60/0015 |
| 10,793,190 | B2* | 10/2020 | Iwami | B62D 15/0285 |
| 10,843,731 | B2* | 11/2020 | Iwami | B60W 40/02 |
| 11,001,301 | B2* | 5/2021 | Joos | B60W 30/06 |
| 11,048,256 | B2* | 6/2021 | Dyer | G05D 1/0088 |
| 11,117,564 | B2* | 9/2021 | Mielenz | G05D 1/0297 |
| 11,430,071 | B2* | 8/2022 | Shalev-Shwartz | G01C 21/3407 |
| 2004/0039632 | A1* | 2/2004 | Han | G08G 1/14 705/13 |
| 2010/0060439 | A1* | 3/2010 | Fitzgerald | B60Q 1/535 340/463 |
| 2010/0141419 | A1* | 6/2010 | Coward | B60Q 1/22 340/464 |
| 2011/0054739 | A1* | 3/2011 | Bammert | B62D 15/028 701/41 |
| 2011/0175717 | A1* | 7/2011 | Drong | B60Q 1/50 340/463 |
| 2011/0199199 | A1* | 8/2011 | Perkins | B60Q 1/525 340/435 |
| 2011/0279261 | A1* | 11/2011 | Gauger | B66F 9/0755 340/669 |
| 2012/0299716 | A1* | 11/2012 | Yoshino | B60Q 1/22 340/463 |
| 2014/0118130 | A1* | 5/2014 | Chang | B60Q 1/525 340/435 |
| 2014/0200769 | A1* | 7/2014 | Noh | B62D 15/0285 701/41 |
| 2014/0225722 | A1* | 8/2014 | Takahashi | G08G 1/16 340/435 |
| 2014/0354450 | A1* | 12/2014 | Takahashi | G01S 13/931 340/904 |
| 2015/0346727 | A1* | 12/2015 | Ramanujam | B62D 15/0285 701/23 |
| 2015/0353080 | A1* | 12/2015 | Mukaiyama | E05B 77/54 701/23 |
| 2016/0059777 | A1* | 3/2016 | Malone | B60Q 9/00 340/426.1 |
| 2016/0075331 | A1* | 3/2016 | Tomozawa | B60W 30/06 701/41 |
| 2016/0075374 | A1* | 3/2016 | Yamashita | B62D 15/0285 701/41 |
| 2016/0355178 | A1 | 12/2016 | Shiraishi | |
| 2017/0096095 | A1* | 4/2017 | Uhrenholt | F21S 43/26 |
| 2017/0110011 | A1* | 4/2017 | Tonguz | G08G 1/087 |
| 2018/0057057 | A1* | 3/2018 | Iwami | B62D 15/0285 |
| 2018/0061241 | A1* | 3/2018 | Iwami | G08G 1/168 |
| 2018/0099663 | A1* | 4/2018 | Diedrich | B60W 40/072 |
| 2018/0157271 | A1* | 6/2018 | Urano | B60W 30/192 |
| 2019/0018419 | A1* | 1/2019 | Lee | G08G 1/096708 |
| 2019/0047591 | A1* | 2/2019 | Augst | B60W 50/16 |
| 2019/0071069 | A1* | 3/2019 | Nordbruch | B60W 30/09 |
| 2019/0088148 | A1* | 3/2019 | Jacobus | G08G 1/166 |
| 2019/0185055 | A1* | 6/2019 | Iwami | B60W 30/06 |
| 2019/0196500 | A1* | 6/2019 | Harasaki | G05D 1/02 |
| 2019/0202451 | A1* | 7/2019 | Hayamizu | B60W 10/18 |
| 2019/0233009 | A1* | 8/2019 | Joos | B60W 30/06 |
| 2020/0019894 | A1* | 1/2020 | Jin | G08G 1/0145 |
| 2020/0086793 | A1* | 3/2020 | Watanabe | G06T 1/00 |
| 2020/0159236 | A1* | 5/2020 | Yoon | B60R 25/25 |
| 2020/0294401 | A1* | 9/2020 | Kerecsen | G08G 1/205 |
| 2021/0300340 | A1* | 9/2021 | Noguchi | G08G 1/017 |

FOREIGN PATENT DOCUMENTS

| | | |
|---|---|---|
| CN | 207558203 U | 6/2018 |
| CN | 108407802 A | 8/2018 |
| JP | 2006-133148 A | 5/2006 |
| JP | 2009-282929 A | 12/2009 |
| JP | 2013-84088 A | 5/2013 |
| JP | 2015-219811 A | 12/2015 |
| JP | 2018-30498 A | 3/2018 |
| JP | 2018-45482 A | 3/2018 |
| JP | 2018-90165 A | 6/2018 |
| WO | 2017/169183 A1 | 10/2017 |

\* cited by examiner

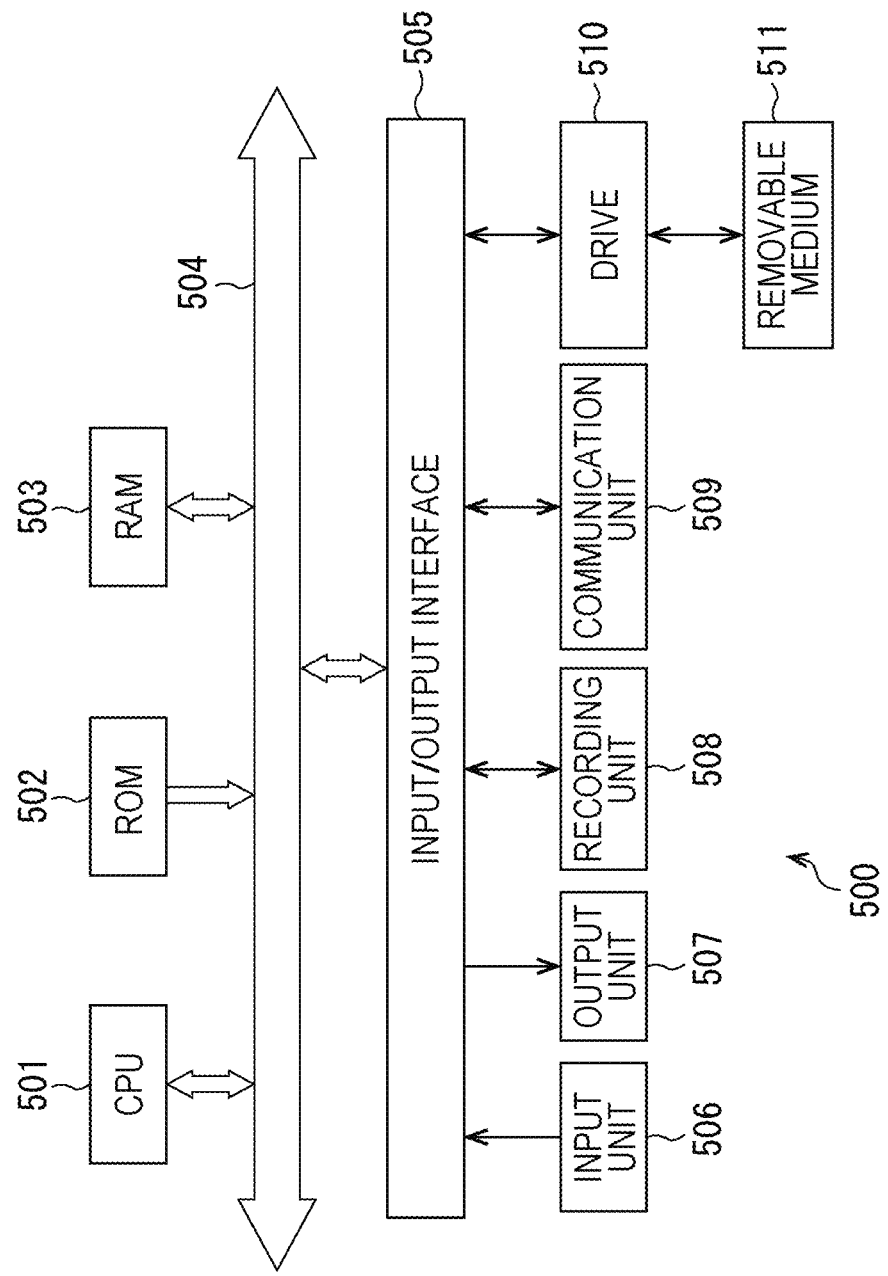

VEHICLE CONTROL DEVICE, VEHICLE CONTROL METHOD, PROGRAM, AND VEHICLE

CROSS-REFERENCE TO RELATED APPLICATIONS

The present application is based on PCT filing PCT/JP2019/047763, filed Dec. 6, 2019, which claims priority to JP 2018-237945, filed Dec. 20, 2018, the entire contents of each are incorporated herein by reference.

TECHNICAL FIELD

The present technology relates to a vehicle control device, a vehicle control method, a program, and a vehicle, and particularly, to a vehicle control device, a vehicle control method, a program, and a vehicle that enable automatic driving to safely bring a vehicle from a parking position to a vehicle traffic region.

BACKGROUND ART

Conventionally, it has been proposed that, in a case where a novice driver drives a vehicle and exits a parking lot to a road, it is determined whether or not it is difficult to turn right, and a route to turn right or left is guided (for example, refer to Patent Document 1).

CITATION LIST

Patent Document

Patent Document 1: Japanese Patent Application Laid-Open No. 2006-133148

SUMMARY OF THE INVENTION

Problems to be Solved by the Invention

However, in the Patent Document 1, a case is not examined where automatic driving brings the vehicle from the parking position to the vehicle traffic region.

The present technology has been made in view of such a situation, and enables automatic driving to bring the vehicle from the parking position to the vehicle traffic region.

Solutions to Problems

A vehicle control device according to a first aspect of the present technology includes a notification control unit that controls a notification to surroundings in a case where a vehicle automatically moves from a parking position and an operation control unit that moves the vehicle from the parking position to make the vehicle join a vehicle traffic region and temporarily stops the vehicle before the vehicle enters the vehicle traffic region.

A vehicle control method according to the first aspect of the present technology performed by a vehicle control device includes controlling a notification to surroundings in a case where a vehicle automatically moves from a parking position, and moving the vehicle from the parking position to make the vehicle join a vehicle traffic region and temporarily stopping the vehicle before the vehicle enters the vehicle traffic region.

A program according to the first aspect of the present technology for causing a computer to execute processing includes controlling a notification to surroundings in a case where a vehicle automatically moves from a parking position, and moving the vehicle from the parking position to make the vehicle join a vehicle traffic region and temporarily stopping the vehicle before the vehicle enters the vehicle traffic region.

A vehicle according to a second aspect of the present technology includes a notification unit, a notification control unit that controls a notification to surroundings by the notification unit in a case where the vehicle automatically moves from a parking position, a driving unit, and an operation control unit that controls the driving unit to move the vehicle from the parking position to make the vehicle join a vehicle traffic region and to temporarily stop the vehicle before the vehicle enters the vehicle traffic region.

In the first aspect of the present technology, the notification to the surroundings in a case where the vehicle automatically moves from the parking position is controlled, the vehicle moves from the parking position to join the vehicle traffic region, and temporarily stops before entering the vehicle traffic region.

In the second aspect of the present technology, the notification by the notification unit to the surroundings in a case where the vehicle automatically moves from the parking position is controlled, and the driving unit is controlled to move the vehicle from the parking position to make the vehicle join the vehicle traffic region, and to temporarily stop the vehicle before the vehicle enters the vehicle traffic region.

BRIEF DESCRIPTION OF DRAWINGS

FIG. 10 is a diagram illustrating an exemplary configuration of a computer.

MODE FOR CARRYING OUT THE INVENTION

Hereinafter, modes for carrying out the present technology will be described. The description will be made in the following order.

1. Embodiment
2. Modification
3. Others

1. Embodiment

First, an embodiment of the present technology will be described with reference to FIGS. 1 to 8.

<Exemplary Configuration of Vehicle Control System 100>

Figure 1:
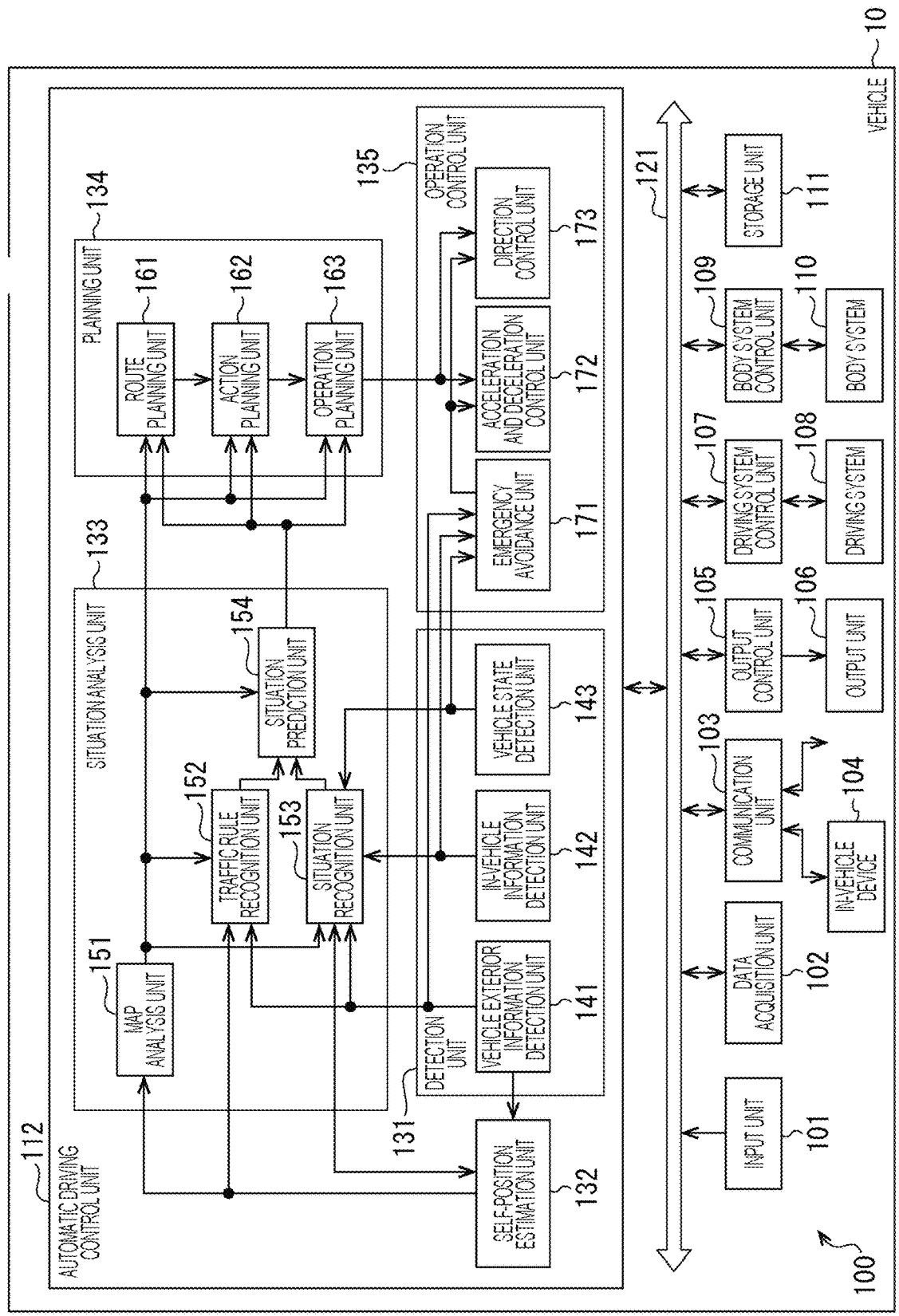
FIG. 1 is a block diagram illustrating an exemplary configuration of a vehicle to which the present technology is applied.

FIG. 1 is a block diagram illustrating an exemplary configuration of a schematic function of a vehicle control system 100 that is an example of a mobile body control system to which the present technology may be applied.

Note that, in a case where a vehicle 10 in which the vehicle control system 100 is provided is distinguished from another vehicle, the vehicle 10 is referred to as an own vehicle.

The vehicle control system 100 includes an input unit 101, a data acquisition unit 102, a communication unit 103, an in-vehicle device 104, an output control unit 105, an output unit 106, a driving system control unit 107, a driving system 108, a body system control unit 109, a body system 110, a storage unit 111, and an automatic driving control unit 112. The input unit 101, the data acquisition unit 102, the communication unit 103, the output control unit 105, the driving system control unit 107, the body system control unit 109, the storage unit 111, and the automatic driving control unit 112 are mutually connected via a communication network 121. The communication network 121 includes, for example, an in-vehicle communication network compliant with an optional standard, for example, a Controller Area Network (CAN), a Local Interconnect Network (LIN), a Local Area Network (LAN), or the FlexRay (registered trademark), a bus, or the like. Note that each unit of the vehicle control system 100 may be directly connected without the communication network 121.

Note that, hereinafter, in a case where each unit of the vehicle control system 100 performs communication via the communication network 121, description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes a device used by an occupant to input various kinds of data, instructions, or the like. For example, the input unit 101 includes an operation device such as a touch panel, a button, a microphone, a switch, or a lever and an operation device that can perform input by a method other than a manual operation using sounds, gestures, or the like. Furthermore, for example, the input unit 101 may be an external connection device such as a remote control device that uses infrared rays and other radio waves or a mobile device or a wearable device that is compatible with the operation of the vehicle control system 100. The input unit 101 generates an input signal on the basis of the data, instructions, or the like input by the occupant and supplies the input signal to each unit of the vehicle control system 100.

The data acquisition unit 102 includes various sensors that acquire data used for the processing of the vehicle control system 100 and supplies the acquired data to each unit of the vehicle control system 100.

For example, the data acquisition unit 102 includes various sensors that detect a state of the own vehicle or the like. Specifically, for example, the data acquisition unit 102 includes a gyro sensor, an acceleration sensor, an inertial measurement device (IMU), sensors that detect an operation amount of an acceleration pedal, an operation amount of a brake pedal, a steering angle of a steering wheel, an engine speed, a motor speed, a wheel rotation speed, or the like.

Furthermore, for example, the data acquisition unit 102 includes various sensors that detect information outside the own vehicle. Specifically, for example, the data acquisition unit 102 includes imaging devices such as a Time Of Flight (ToF) camera, a stereo camera, a monocular camera, an infrared camera, other cameras, or the like. Furthermore, for example, the data acquisition unit 102 includes an environmental sensor that detects the weather, the meteorological phenomenon, or the like and a surrounding information detection sensor that detects an object around the own vehicle. The environmental sensor includes, for example, a raindrop sensor, a fog sensor, a sunshine sensor, a snow sensor, or the like. The surrounding information detection sensor includes, for example, an ultrasonic wave sensor, a radar, a Light Detection and Ranging and Laser Imaging Detection and Ranging (LiDAR), a sonar, or the like.

Moreover, for example, the data acquisition unit 102 includes various sensors to detect a current position of the own vehicle. Specifically, for example, the data acquisition unit 102 includes a Global Navigation Satellite System (GNSS) receiver that receives a GNSS signal from a GNSS satellite, or the like.

Furthermore, for example, the data acquisition unit 102 includes various sensors that detect in-vehicle information. Specifically, for example, the data acquisition unit 102 includes an imaging device that images a driver, a biometric sensor that detects biological information of the driver, a microphone that collects sounds in the vehicle interior, or the like. The biometric sensor is provided, for example, in a seat surface, a steering wheel, or the like and detects biological information of an occupant who sits on the seat or a driver who holds a steering wheel.

The communication unit 103 communicates with the in-vehicle device 104, various devices outside the vehicle, a server, a base station, or the like. The communication unit 103 transmits data supplied from each unit of the vehicle control system 100 and supplies the received data to each unit of the vehicle control system 100. Note that a communication protocol supported by the communication unit 103 is not particularly limited. Furthermore, the communication unit 103 can support a plurality of types of communication protocols.

For example, the communication unit 103 performs wireless communication with the in-vehicle device 104 by using a wireless LAN, the Bluetooth (registered trademark), Near Field Communication (NFC), a Wireless USB (WUSB), or the like. Alternatively, for example, the communication unit 103 performs wired communication with the in-vehicle device 104 by using a Universal Serial Bus (USB), the High-Definition Multimedia Interface (HDMI) (registered trademark), the Mobile High-definition Link (MHL), or the like via a connection terminal which is not illustrated (and cable as necessary).

Moreover, for example, the communication unit 103 communicates with a device (for example, application server or control server) that exists on an external network (for example, the Internet, cloud network, or company-specific network) via a base station or an access point. Furthermore, for example, the communication unit 103 communicates with a terminal near the own vehicle (for example, terminal of pedestrian or shop or Machine Type Communication (MTC) terminal) by using the Peer To Peer (P2P) technology. Moreover, for example, the communication unit 103 performs V2X communication such as Vehicle to Vehicle (intervehicle) communication, Vehicle to Infrastructure (between vehicle and infrastructure) communication, Vehicle to Home (between own vehicle and home) communication, and Vehicle to Pedestrian (between vehicle and pedestrian) communication. Furthermore, for example, the communication unit 103 includes a beacon reception unit, receives radio waves or electromagnetic waves transmitted from a wireless station installed on a road or the like, and acquires information including the current position, congestion, traffic regulations, a required time, or the like.

The in-vehicle device 104 includes, for example, a mobile device or a wearable device of the occupant, or an information device carried in or attached to the own vehicle, and a navigation device that searches for a route to an optional destination or the like.

The output control unit 105 controls an output of various types of information to the occupant of the own vehicle or the outside of the own vehicle. For example, the output control unit 105 generates an output signal including at least one of visual information (for example, image data) or auditory information (for example, audio data) and supplies the generated signal to the output unit 106 so as to control the outputs of the visual information and the auditory information from the output unit 106. Specifically, for example, the output control unit 105 synthesizes pieces of image data imaged by different imaging devices of the data acquisition unit 102, generates a bird's eye image, a panoramic image, or the like, and supplies an output signal including the generated image to the output unit 106. Furthermore, for example, the output control unit 105 generates audio data including warning sound, a warning message, or the like for danger such as collision, contact, entry to a dangerous zone, or the like, and supplies an output signal including the generated audio data to the output unit 106.

The output unit 106 includes a device that can output the visual information or the auditory information to the occupant of the own vehicle or the outside of the vehicle. For example, the output unit 106 includes a display device, an instrument panel, an audio speaker, a headphone, a wearable device such as a glass-shaped display worn by the occupant, a projector, a lamp, or the like. The display device included in the output unit 106 may be a device that displays the visual information in a field of view of the driver, for example, a head-up display, a transmissive display, a device having an Augmented Reality (AR) display function, or the like, in addition to a device having a normal display.

The driving system control unit 107 generates various control signals and supplies the generated signals to the driving system 108 so as to control the driving system 108. Furthermore, the driving system control unit 107 supplies the control signal to each unit other than the driving system 108 as necessary and issues a notification of a control state of the driving system 108 or the like.

The driving system 108 includes various devices related to the driving system of the own vehicle. For example, the driving system 108 includes a driving force generation device that generates a driving force such as an internal combustion engine, a driving motor, or the like, a driving force transmission mechanism that transmits the driving force to the wheels, a steering mechanism that adjusts the steering angle, a braking device that generates a braking force, an Antilock Brake System (ABS), an Electronic Stability Control (ESC), an electronic power steering device, or the like.

The body system control unit 109 generates various control signals and supplies the generated signals to the body system 110 so as to control the body system 110. Furthermore, the body system control unit 109 supplies the control signal to each unit other than the body system 110 as necessary and issues a notification of a control state of the body system 110 or the like.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lamps, indicators, fog lights, hazard indicators, or the like), or the like.

The storage unit 111 includes, for example, a magnetic storage device such as a Read Only Memory (ROM), a Random Access Memory (RAM), or a Hard Disc Drive (HDD), a semiconductor storage device, an optical storage device, a magneto-optical storage device, or the like. The storage unit 111 stores various programs, data, or the like used by each unit of the vehicle control system 100. For example, the storage unit 111 stores map data such as a three-dimensional high-accuracy map such as a dynamic map, a global map that covers a wide area and has lower accuracy than the high-accuracy map, a local map including information around the own vehicle, or the like.

The automatic driving control unit 112 controls the automatic driving such as autonomous traveling, driving assistance, or the like. Specifically, for example, the automatic driving control unit 112 performs cooperative control to realize a function of an Advanced Driver Assistance System (ADAS) including collision avoidance or impact relaxation of the own vehicle, following traveling based on a distance between vehicles, a vehicle speed maintaining travel, an own vehicle collision warning, a lane deviation warning of the own vehicle, or the like. Furthermore, for example, the automatic driving control unit 112 performs cooperative control for the automatic driving for autonomous traveling without depending on the operation by the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, an in-vehicle information detection unit 142, and a vehicle state detection unit 143.

The vehicle exterior information detection unit 141 executes processing for detecting information outside the own vehicle on the basis of the data or the signal from each unit of the vehicle control system 100. For example, the vehicle exterior information detection unit 141 executes detection processing, recognition processing, and tracking processing on an object around the own vehicle and processing for detecting a distance to the object. The object to be detected includes, for example, a vehicle, a person, an obstacle, a structure, a road, a traffic light, a traffic sign, a road marking, or the like. Furthermore, for example, the vehicle exterior information detection unit 141 executes processing for detecting environment around the own vehicle. The surrounding environment to be detected includes, for example, the weather, the temperature, the humidity, the brightness, the state of the road surface, or the like. The vehicle exterior information detection unit 141 supplies data indicating the result of the detection processing to the self-position estimation unit 132, a map analysis unit 151, a traffic rule recognition unit 152, and a situation recognition unit 153 of the situation analysis unit 133, and an emergency avoidance unit 171 of the operation control unit 135, or the like.

The in-vehicle information detection unit 142 executes processing for detecting information in the vehicle on the basis of the data or the signal from each unit of the vehicle control system 100. For example, the in-vehicle information detection unit 142 executes processing for authenticating and recognizing the driver, processing for detecting the driver's state, processing for detecting the occupant, processing for detecting in-vehicle environment, or the like. The driver's state to be detected includes, for example, a physical condition, a wakefulness degree, a concentration level, a fatigue level, a line-of-sight direction, or the like. The in-vehicle environment to be detected includes, for example, the temperature, the humidity, the brightness, the odor, or the like. The in-vehicle information detection unit 142 supplies the data indicating the result of the detection processing to the situation recognition unit 153 of the situation analysis unit 133, the emergency avoidance unit 171 of the operation control unit 135, or the like.

The vehicle state detection unit 143 executes processing for detecting a state of the own vehicle on the basis of the data or the signal from each unit of the vehicle control system 100. The state of the own vehicle to be detected includes, for example, the speed, the acceleration, the steering angle, whether or not an abnormality occurs, content of the abnormality, a driving operation state, a position and inclination of a power seat, a door lock state, a state of other in-vehicle devices, or the like. The vehicle state detection unit 143 supplies the data indicating the result of the detection processing to the situation recognition unit 153 of the situation analysis unit 133, the emergency avoidance unit 171 of the operation control unit 135, or the like.

The self-position estimation unit 132 executes processing for estimating the position, the posture, or the like of the own vehicle on the basis of the data or the signal from each unit of the vehicle control system 100 such as the vehicle exterior information detection unit 141, the situation recognition unit 153 of the situation analysis unit 133, or the like. Furthermore, the self-position estimation unit 132 generates a local map used to estimate the self-position (hereinafter, referred to as self-position estimation map) as necessary. The self-position estimation map is, for example, a map with high accuracy using a technology such as Simultaneous Localization and Mapping (SLAM). The self-position estimation unit 132 supplies the data indicating the result of the estimation processing to the map analysis unit 151, the traffic rule recognition unit 152, the situation recognition unit 153, or the like of the situation analysis unit 133. Furthermore, the self-position estimation unit 132 makes the storage unit 111 store the self-position estimation map.

The situation analysis unit 133 executes processing for analyzing the situations of the own vehicle and surroundings. The situation analysis unit 133 includes the map analysis unit 151, the traffic rule recognition unit 152, the situation recognition unit 153, and a situation prediction unit 154.

While using the data or the signal from each unit of the vehicle control system 100 such as the self-position estimation unit 132, the vehicle exterior information detection unit 141, or the like as necessary, the map analysis unit 151 executes processing for analyzing various maps stored in the storage unit 111 and constructs a map including information necessary for the automatic driving processing. The map analysis unit 151 supplies the constructed map to the traffic rule recognition unit 152, the situation recognition unit 153, the situation prediction unit 154, and a route planning unit 161, an action planning unit 162, an operation planning unit 163, or the like of the planning unit 134.

The traffic rule recognition unit 152 executes processing for recognizing traffic rules around the own vehicle on the basis of the data or the signal from each unit of the vehicle control system 100 such as the self-position estimation unit 132, the vehicle exterior information detection unit 141, the map analysis unit 151, or the like. According to this recognition processing, for example, a position and a state of a traffic light around the own vehicle, content of traffic regulations around the own vehicle, a traffic lane on which the own vehicle can travel, or the like are recognized. The traffic rule recognition unit 152 supplies the data indicating the result of the recognition processing to the situation prediction unit 154 or the like.

The situation recognition unit 153 executes processing for recognizing a situation of the own vehicle on the basis of the data or the signal from each unit of the vehicle control system 100 such as the self-position estimation unit 132, the vehicle exterior information detection unit 141, the in-vehicle information detection unit 142, the vehicle state detection unit 143, the map analysis unit 151, or the like. For example, the situation recognition unit 153 executes processing for recognizing a situation of the own vehicle, a situation around the own vehicle, a situation of the driver of the own vehicle, or the like. Furthermore, the situation recognition unit 153 generates a local map used to recognize the situation around the own vehicle (hereinafter, referred to as situation recognition map) as necessary. The situation recognition map is, for example, an Occupancy Grid Map (Occupancy Grid Map).

The situation of the own vehicle to be recognized includes, for example, the position, the posture, the movement (for example, speed, acceleration, moving direction, or the like) of the own vehicle, and whether or not an abnormality occurs, content of the abnormality, or the like. The situation around the own vehicle to be recognized includes, for example, a type and a position of a stationary object around the own vehicle, a type of a moving object around the own vehicle, a position and a movement (for example, speed, acceleration, moving direction, or the like), a configuration of a road around the own vehicle and a state of a road surface, and the weather, the temperature, the humidity, the brightness, or the like around the own vehicle. The driver's state to be detected includes, for example, a physical condition, a wakefulness degree, a concentration level, a fatigue level, a line-of-sight movement, a driving operation, or the like.

The situation recognition unit 153 supplies the data indicating the result of the recognition processing (including situation recognition map as necessary) to the self-position estimation unit 132, the situation prediction unit 154, or the like. Furthermore, the situation recognition unit 153 makes the storage unit 111 store the situation recognition map.

The situation prediction unit 154 executes processing for predicting the situation of the own vehicle on the basis of the data or the signal from each unit of the vehicle control system 100 such as the map analysis unit 151, the traffic rule recognition unit 152, or the situation recognition unit 153. For example, the situation prediction unit 154 executes the processing for predicting the situation of the own vehicle, the situation around the own vehicle, the situation of the driver, or the like.

The situation of the own vehicle to be predicted includes, for example, a behavior of the own vehicle, occurrence of an abnormality, a travelable distance, or the like. The situation around the vehicle to be predicted includes, for example, a behavior of a moving object around the own vehicle, a change in a state of the traffic light, a change in the environment such as the weather, or the like. The situation of the driver to be predicted includes, for example, a behavior, a physical condition, or the like of the driver.

The situation prediction unit 154 supplies the data indicating the result of the prediction processing to the route planning unit 161, the action planning unit 162, the operation planning unit 163, or the like of the planning unit 134 together with the data from the traffic rule recognition unit 152 and the situation recognition unit 153.

The route planning unit 161 plans a route to a destination on the basis of the data or the signal from each unit of the vehicle control system 100 such as the map analysis unit 151, the situation prediction unit 154, or the like. For example, the route planning unit 161 sets a route from the current position to a designated destination on the basis of a global map. Furthermore, for example, the route planning unit 161 appropriately changes the route on the basis of a situation such as congestions, accidents, traffic regulations, or constructions, the physical condition of the driver, or the like. The route planning unit 161 supplies data indicating the planned route to the action planning unit 162 or the like.

The action planning unit 162 plans an action of the own vehicle to safely travel the route planned by the route planning unit 161 within a planned time on the basis of the data or the signal from each unit of the vehicle control system 100 such as the map analysis unit 151 or the situation prediction unit 154. For example, the action planning unit 162 makes a plan regarding starting, stopping, a traveling direction (for example, forward, backward, turning left, turning right, turning, or the like), a traveling lane, a traveling speed, overtaking, or the like. The action planning unit 162 supplies data indicating the planned action of the own vehicle to the operation planning unit 163 or the like.

The operation planning unit 163 plans an operation of the own vehicle to realize the action planned by the action planning unit 162 on the basis of the data or the signal from each unit of the vehicle control system 100 such as the map analysis unit 151 or the situation prediction unit 154. For example, the operation planning unit 163 plans acceleration, deceleration, a traveling track, or the like. The operation planning unit 163 supplies data indicating the planned operation of the own vehicle to an acceleration and deceleration control unit 172, a direction control unit 173, or the like of the operation control unit 135.

The operation control unit 135 controls the operation of the own vehicle. The operation control unit 135 includes the emergency avoidance unit 171, the acceleration and deceleration control unit 172, and the direction control unit 173.

The emergency avoidance unit 171 executes processing for detecting an emergency such as collisions, contacts, entry to the dangerous zone, an abnormality of the driver, or an abnormality of the vehicle on the basis of the detection results of the vehicle exterior information detection unit 141, the in-vehicle information detection unit 142, and the vehicle state detection unit 143. In a case where the occurrence of the emergency is detected, the emergency avoidance unit 171 plans an operation of the own vehicle to avoid an emergency such as sudden stop, sudden turn, or the like. The emergency avoidance unit 171 supplies data indicating the planned operation of the own vehicle to the acceleration and deceleration control unit 172, the direction control unit 173, or the like.

The acceleration and deceleration control unit 172 controls acceleration and deceleration to realize the operation of the own vehicle planned by the operation planning unit 163 or the emergency avoidance unit 171. For example, the acceleration and deceleration control unit 172 calculates a control target value of the driving force generation device or the braking device used to realize the planned acceleration, deceleration, or sudden stop and supplies a control instruction indicating the calculated control target value to the driving system control unit 107.

The direction control unit 173 controls a direction to realize the operation of the own vehicle planned by the operation planning unit 163 or the emergency avoidance unit 171. For example, the direction control unit 173 calculates a control target value of the steering mechanism to realize a traveling track or a sudden turn planned by the operation planning unit 163 or the emergency avoidance unit 171 and supplies a control instruction indicating the calculated control target value to the driving system control unit 107.

<Exemplary Configuration of Body System Control Unit 109 and Body System 110>

Figure 2:
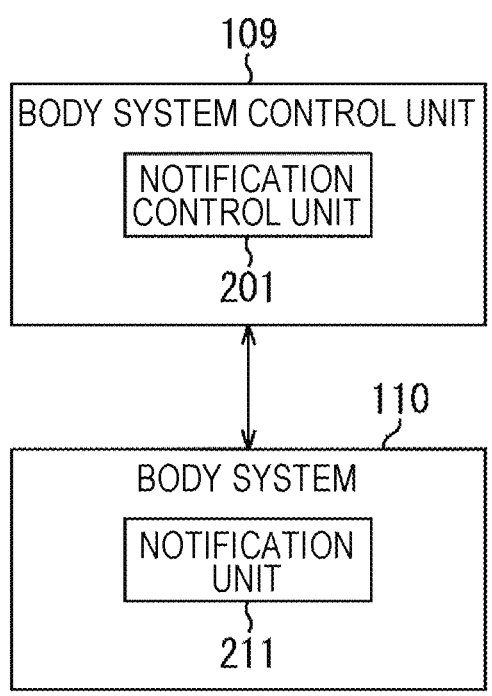
FIG. 2 is a block diagram illustrating an exemplary configuration of a body system control unit and a body system.

Next, FIG. 2 is a block diagram illustrating a part of an exemplary configuration of the body system control unit 109 and the body system 110 of the vehicle control system 100.

The body system control unit 109 includes a notification control unit 201. The body system 110 includes a notification unit 211.

The notification control unit 201 controls various notifications issued by the notification unit 211.

The notification unit 211 includes, for example, a device for notification to the surroundings of the vehicle 10 such as hazard indicators.

<Detection Ranges of Sensors>

Figure 3:
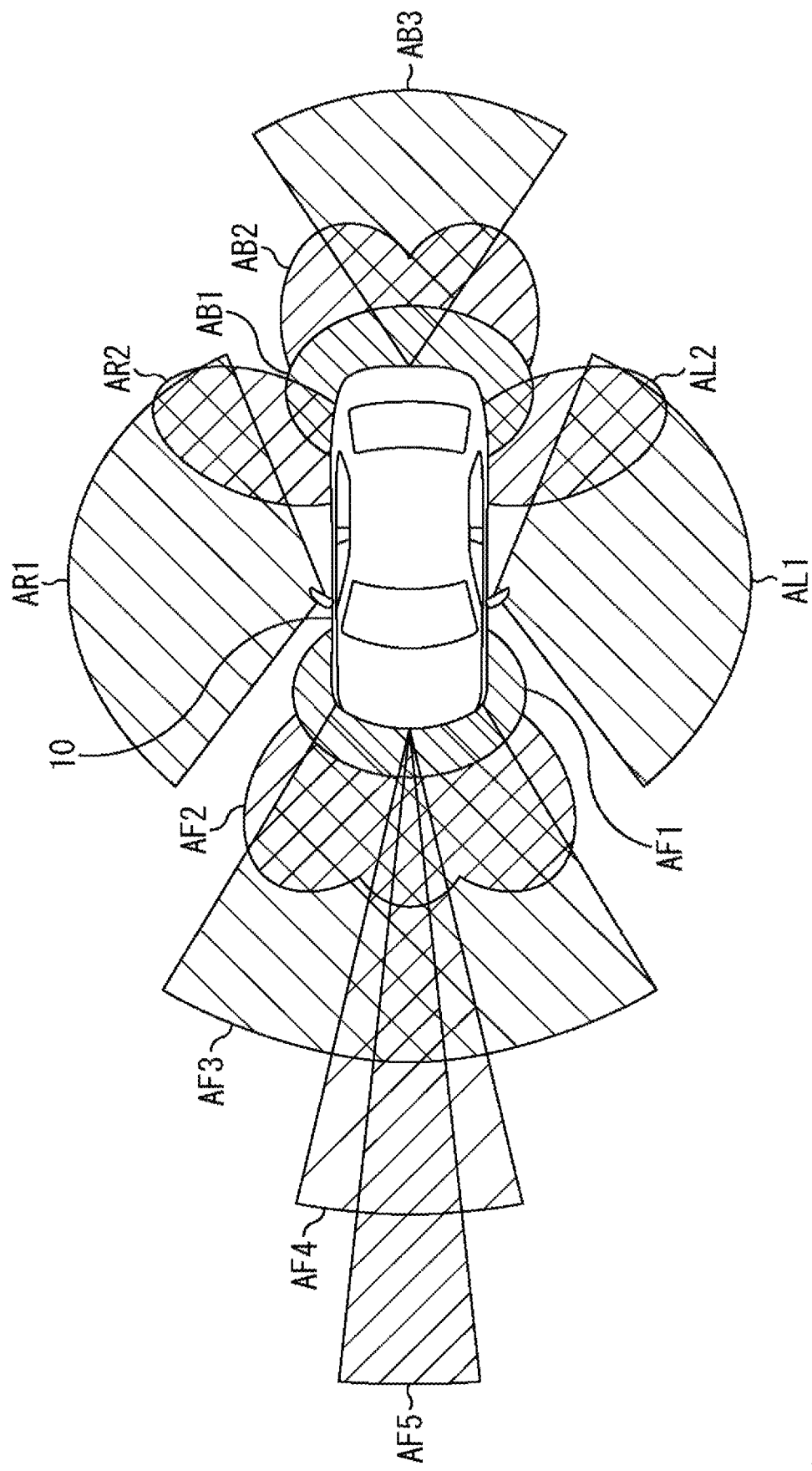
FIG. 3 is a diagram illustrating an example of a vehicle detection region.

FIG. 3 illustrates examples of ranges where sensors provided in the data acquisition unit 102 detect information outside the vehicle 10.

For example, an ultrasonic wave sensor detects information regarding regions AF1 and AB1. The region AF1 is a region near the front side of the vehicle 10. The region AB1 is a region near the rear side of the vehicle 10. The information detected from the regions AF1 and AB1 is used, for example, for parking assistance of the vehicle 10.

For example, a short-range radar or a medium-range radar detects information regarding regions AF2, AB2, AR2, and AL2. The region AF2 is a region at a short distance from and on the front side of the vehicle 10. The region AB2 is a region at a short distance from and on the rear side of the vehicle 10. The region AR2 is a region that is blind on the right rear side of the vehicle 10. The region AL2 is a region that is blind on the left rear side of the vehicle 10. The information regarding the regions AF2, AB2, AR2, and AL2 is used, for example, to detect a pedestrian, an obstacle, or the like around the vehicle 10.

For example, a camera detects information regarding regions AF3, AB3, AR1, and AL1. The region AF3 covers a region, on the front side of the vehicle 10, farther than the region AF2. The region AB3 covers a region, on the rear side of the vehicle 10, farther than the region AB2. The region AR3 is a region on the right side of the vehicle 10. The region AL3 is a region on the left side of the vehicle 10. The information regarding the regions AF3, AB3, AR3, and AL3 is used, for example, to detect other vehicles, a pedestrian, an obstacle, or the like around the vehicle 10. Furthermore, the information regarding the region AF3 is used, for example, for emergency braking, collision avoidance, recognition of road signs and traffic lights, detection of lanes, or the like. Moreover, the information regarding the region AB3 is used, for example, for parking assistance.

For example, the LiDAR detects information regarding a region AF4. The region AF4 covers a region, on the front side of the vehicle 10, that is farther than the region AF3 and is narrow in the horizontal direction. The information regarding the region AF4 is used, for example, for detection of other vehicles, a pedestrian, an obstacle, or the like, emergency braking, collision avoidance, or the like.

For example, a long-range radar detects information regarding a region AF5. The region AF5 covers a region, on the front side of the vehicle 10, that is farther than the region AF4 and is narrow in the horizontal direction. The information regarding the region AF5 is used, for example, for detection of other vehicles, a pedestrian, an obstacle, or the like, control of following to a proceeding vehicle, or the like.

<Unloading Processing>

Figure 4:
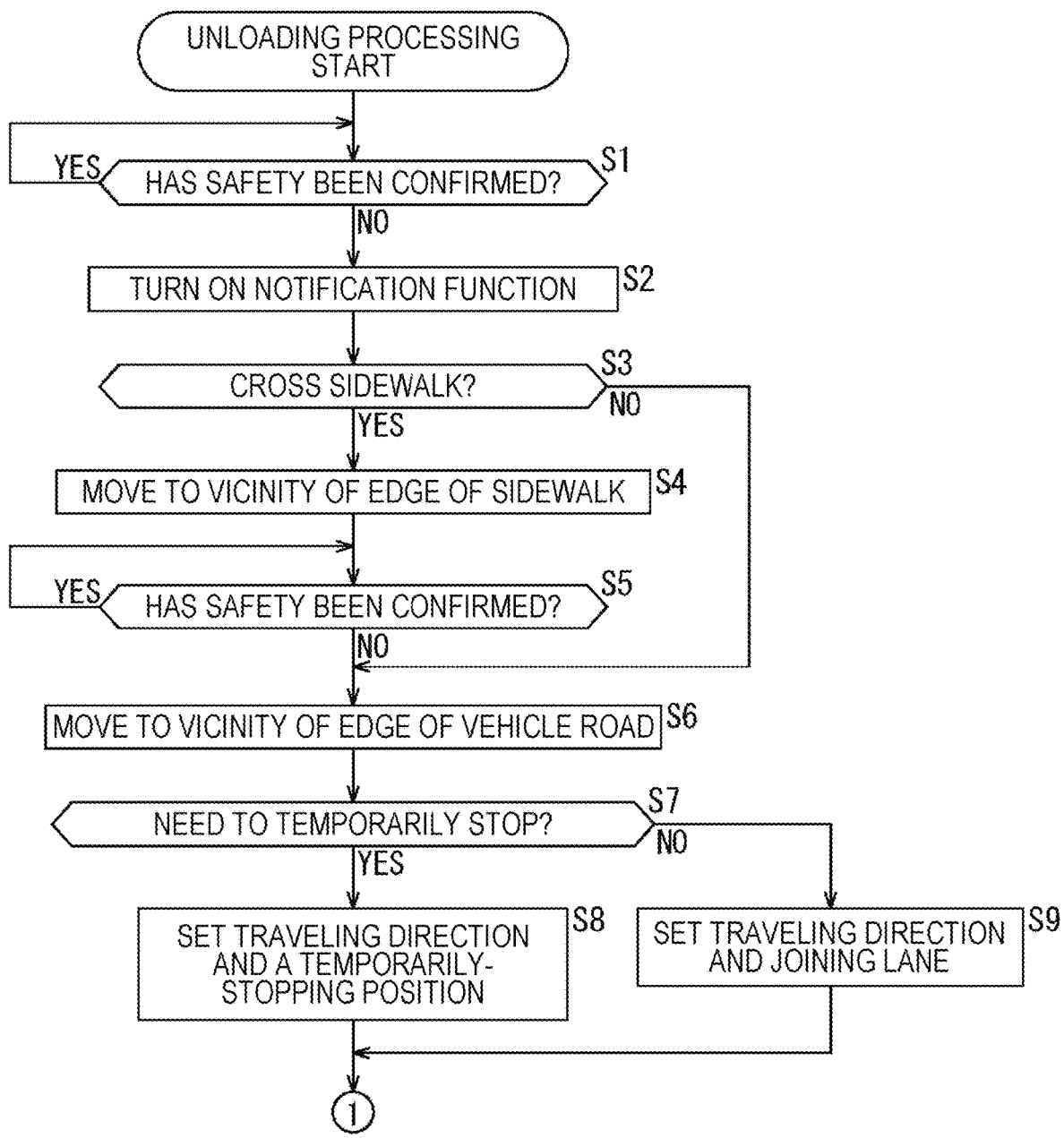
FIG. 4 is a flowchart for explaining unloading processing.
Figure 5:
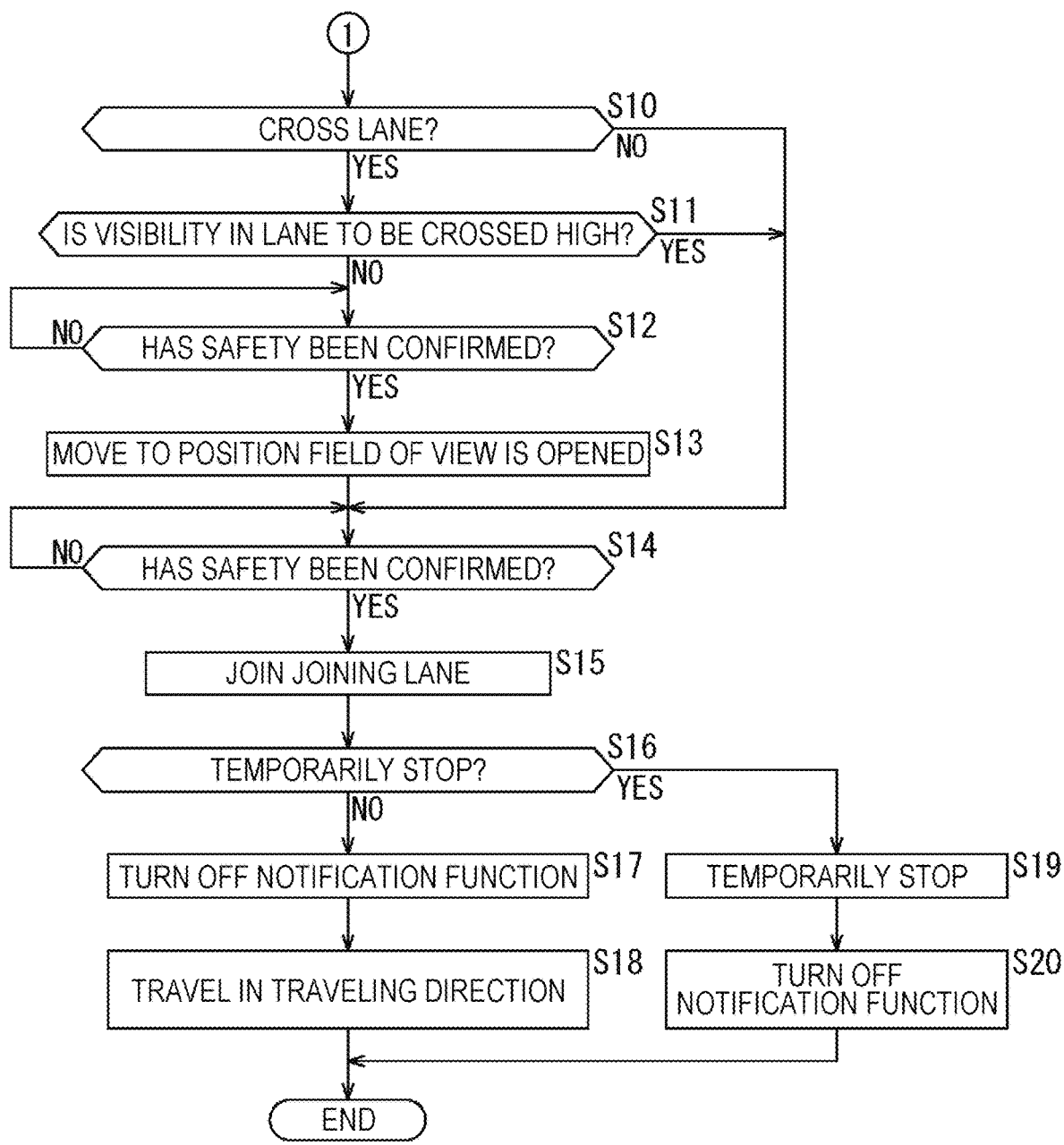
FIG. 5 is a flowchart for explaining the unloading processing.

Next, unloading processing executed by the vehicle 10 will be described with reference to the flowcharts in FIGS. 4 and 5.

Note that description will be made appropriately using FIGS. 6 to 8 as specific examples.

Figure 6:
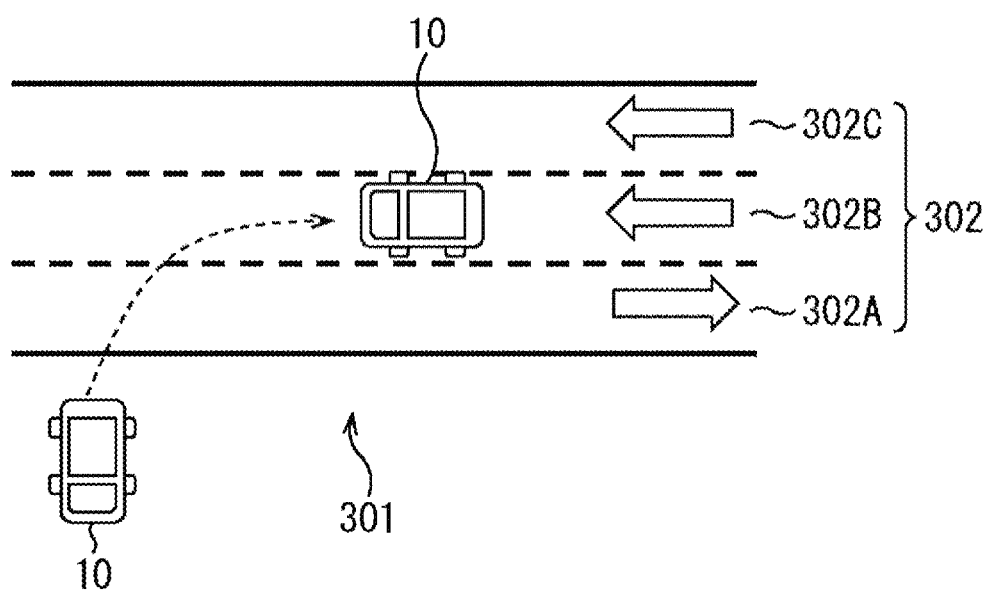
FIG. 6 is a diagram illustrating an example of the unloading processing.

FIG. 6 illustrates an example in which the vehicle 10 moves backward and exits from a parking lot 301 and joins a lane 302B of a road 302. Lanes 302A to 302C are disposed on the road 302 in order from the lane closest to the parking lot 301. Therefore, the road 302 includes a vehicle road including the lanes 302A to 302C. The lane 302A is a lane toward the right side in the figure, and the lanes 302B and 302C are lanes toward the left side in the figure.

Figure 7:
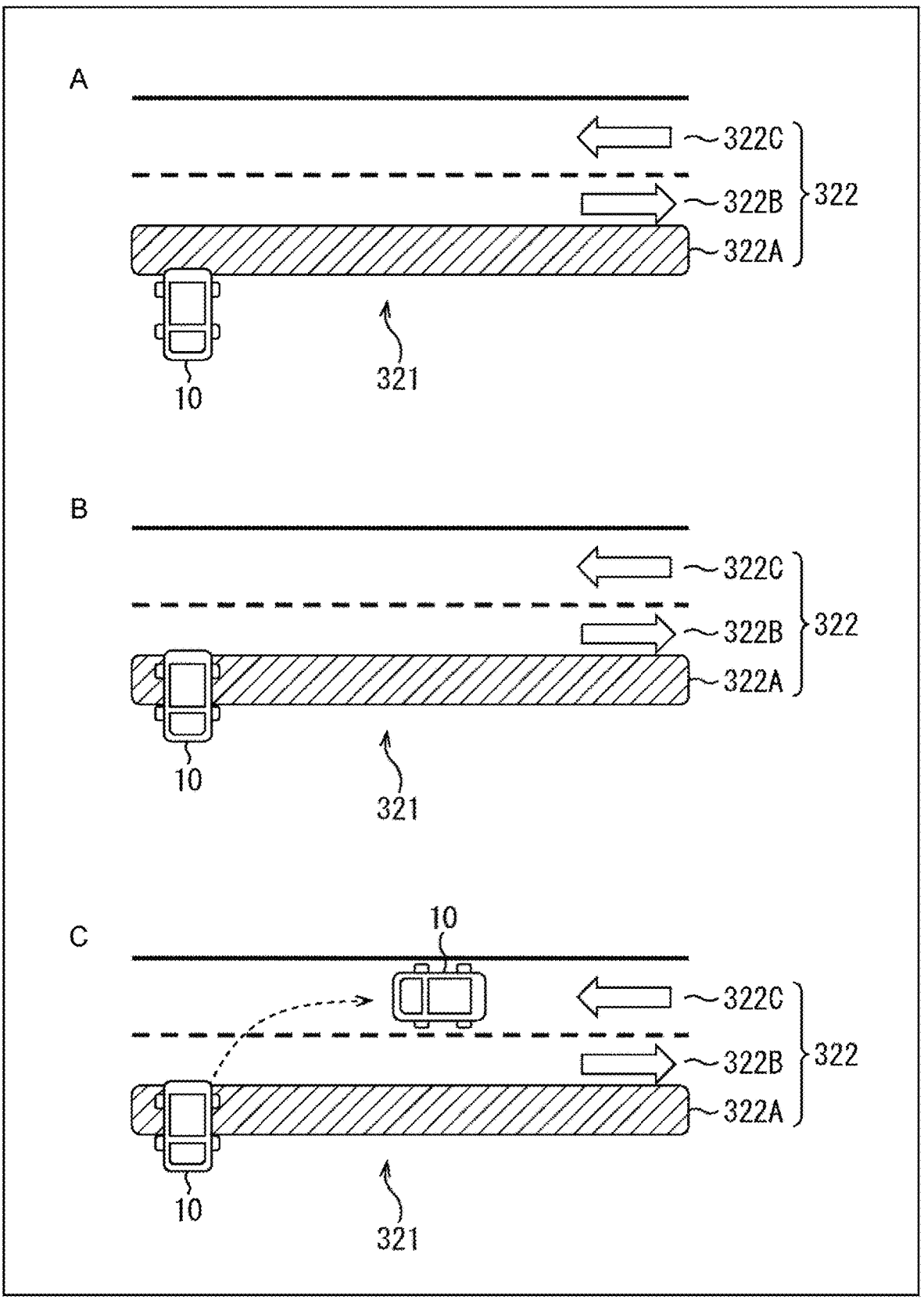
FIG. 7 is a diagram illustrating an example of the unloading processing.

FIG. 7 illustrates an example in which the vehicle 10 moves backward and exits from a parking lot 321 and joins a lane 322C of a road 322. On the road 322, a sidewalk 322A, a lane 322B, and the lane 322C are disposed in order from the lane closest to the parking lot 321. Therefore, the road 322 includes a vehicle road including the lanes 322B and 322C. The lane 322B is a lane toward the right side in the figure, and the lane 322C is a lane toward the left side in the figure.

Figure 8:
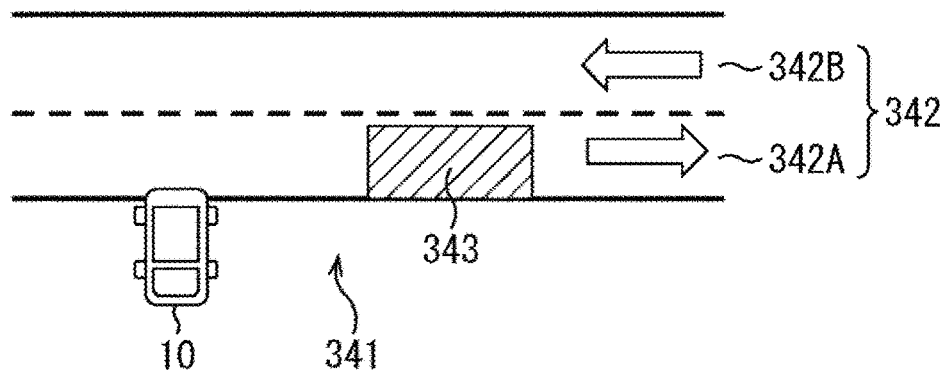
FIG. 8 is a diagram illustrating an example of the unloading processing.
Figure 8:
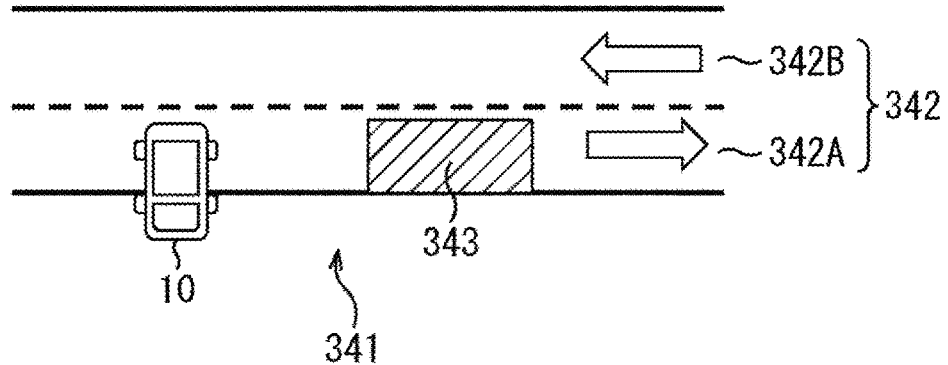
Figure 8:
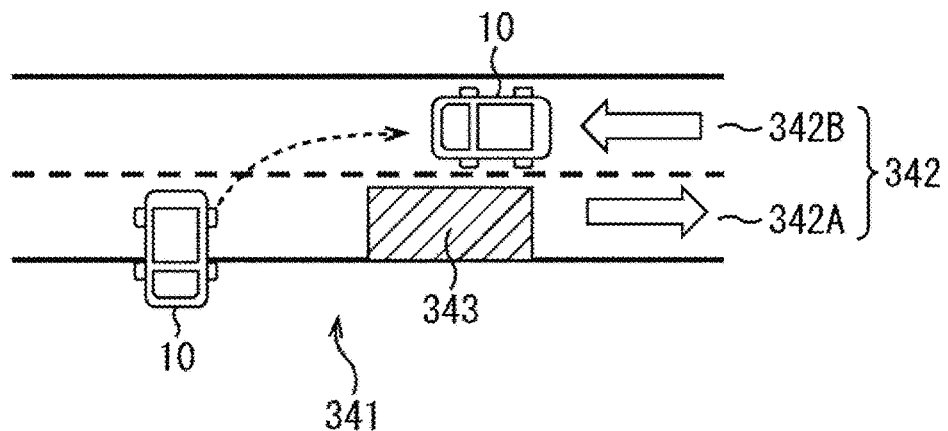

FIG. 8 illustrates an example in which the vehicle 10 moves backward and exits from a parking lot 341 and joins a lane 342B of a road 342. On the road 342, a lane 342A and the lane 342B are disposed in order from the lane closest to the parking lot 341. The road 342 includes a vehicle road including the lanes 342A and 342B. The lane 342A is a lane toward the right side in the figure, and the lane 342B is a lane toward the left side in the figure. A vehicle 343 is parked on the right side of the vehicle 10 in the lane 342A.

In step S1, the situation recognition unit 153 determines whether or not safety has been confirmed.

Specifically, for example, the vehicle exterior information detection unit 141 starts processing for focusing on detection of a traveling direction of the vehicle and an obstacle around the vehicle 10 in the parking lot so as not to collide or contact with other vehicles, pedestrians, or the like in the parking lot. For example, in a case where the vehicle 10 moves backward, the vehicle exterior information detection unit 141 focuses on processing for detecting obstacles in the regions AB1, AB2, and AB3 in FIG. 3. For example, in a case where the vehicle 10 moves forward, the vehicle exterior information detection unit 141 focuses on processing for detecting obstacles in the regions AF1, AF2, and AF3 in FIG. 3. The vehicle exterior information detection unit 141 supplies data indicating the result of the detection processing to the situation recognition unit 153 or the like.

The situation recognition unit 153 determines whether or not safety has been confirmed on the basis of the data from the vehicle exterior information detection unit 141. The determination processing in step S1 is repeatedly executed until it is determined that safety has been confirmed. For example, in a case where there is no obstacle in the traveling direction of the vehicle 10 and around the vehicle 10 in the parking lot, the situation recognition unit 153 determines that the safety has been confirmed, and the procedure proceeds to step S2.

In step S2, the notification unit 211 turns on a notification function under control of the notification control unit 201. For example, in a case where the notification unit 211 includes hazard indicators, the hazard indicators start blinking. As a result, before the vehicle 10 moves from the parking position, a notification, indicating that the vehicle 10 moves from the parking position, exits from the parking lot, and joins the vehicle road, is issued to surroundings of the vehicle 10.

In step S3, the situation recognition unit 153 determines whether or not to cross the sidewalk on the basis of the data from the vehicle exterior information detection unit 141. For example, in a case where a sidewalk exists between the parking lot and the vehicle road to which the vehicle 10 joins, the situation recognition unit 153 determines to cross the sidewalk, and the procedure proceeds to step S4. For example, in the example in FIG. 7, it is determined that the vehicle 10 crosses the sidewalk 322A, and the procedure proceeds to step S4.

In step S4, the vehicle 10 moves to the vicinity of an edge of the sidewalk. Specifically, the driving system control unit 107 controls the driving system 108 under control of the operation control unit 135 and moves the vehicle 10 to the vicinity of a front edge (side of vehicle 10) of the sidewalk. Thereafter, the driving system control unit 107 temporarily stops the vehicle 10.

For example, as illustrated in A of FIG. 7, the vehicle 10 automatically moves until the rear end reaches near the boundary between the parking lot 321 and the sidewalk 322A. In this case, for example, for easy confirmation of situations of left and right sides of the vehicle 10 in the sidewalk 322A, the rear end of the vehicle 10 may slightly enter the sidewalk 322A.

Furthermore, for example, the vehicle exterior information detection unit 141 starts processing for focusing on detecting the traveling direction of the vehicle 10 in the sidewalk and detecting obstacle in a region around the traveling direction so as not to collide or contact with a pedestrian, a bicycle, or the like in the sidewalk. For example, in a case where the vehicle 10 moves backward, the vehicle exterior information detection unit 141 focuses on processing for detecting obstacles in the regions AB1, AB2, AB3, AR2, and AL2 in FIG. 3. For example, in a case where the vehicle 10 moves forward, the vehicle exterior information detection unit 141 focuses on processing for detecting obstacles in the regions AF1, AF2, and AF3 in FIG. 3. Therefore, the region where the obstacle detection processing is focused on after the vehicle 10 stops near the edge of the sidewalk is changed from that before the vehicle 10 has stopped near the edge of the sidewalk. The vehicle exterior information detection unit 141 supplies data indicating the result of the detection processing to the situation recognition unit 153 or the like.

In step S5, the situation recognition unit 153 determines whether or not the safety has been confirmed on the basis of the data from the vehicle exterior information detection unit 141. The determination processing in step S5 is repeatedly executed until it is determined that the safety has been confirmed. For example, in a case where there is no obstacle in the traveling direction of the vehicle 10 and around the traveling direction of the vehicle 10 in the sidewalk, the situation recognition unit 153 determines that the safety has been confirmed, and the procedure proceeds to step S6.

On the other hand, in a case where it is determined, in step S3, that the vehicle does not cross the sidewalk, the processing in steps S4 and S5 is skipped, and the procedure proceeds to step S6. For example, in the examples in FIGS. 6 and 8, it is determined that the vehicle does not cross the sidewalk, and the procedure proceeds to step S6.

In step S6, the vehicle 10 moves to the vicinity of the edge of the vehicle road. Specifically, the driving system control unit 107 controls the driving system 108 under the control of the operation control unit 135 and moves the vehicle 10 to the vicinity of the front edge (side of vehicle 10) of the vehicle road. Thereafter, the driving system control unit 107 temporarily stops the vehicle 10.

For example, in the example in FIG. 6, the vehicle 10 automatically moves until the rear end reaches near the boundary between the parking lot 301 and the lane 302A. In this case, for example, for easy confirmation of situations of left and right sides of the vehicle 10 in the lane 302A, the rear end of the vehicle 10 may slightly enter the lane 302A.

Furthermore, for example, as illustrated in B of FIG. 7, the vehicle 10 automatically moves until the rear end reaches near the boundary between the sidewalk 322A and the lane 322B. In this case, for example, for easy confirmation of situations of left and right sides of the vehicle 10 in the lane 322B, the rear end of the vehicle 10 may slightly enter the lane 322B.

Moreover, for example, as illustrated in A of FIG. 8, the vehicle 10 automatically moves until the rear end reaches near the boundary between the parking lot 341 and the lane 342A. In this case, for example, for easy detection of situations of left and right sides of the vehicle 10 in the lane 342A, the rear end of the vehicle 10 may slightly enter the lane 342A.

Furthermore, for example, the vehicle exterior information detection unit 141 starts processing for focusing on processing for detecting obstacles in the traveling direction of the vehicle 10 and in the regions on the right and left side of the vehicle 10 in the vehicle road so as not to collide or contact with the other vehicle or the like that approaches the vehicle 10 in the vehicle road. For example, in a case where the vehicle 10 moves backward, the vehicle exterior information detection unit 141 focuses on processing for detecting obstacles in the regions AB1, AB2, AB3, AR1, AR2, AL1, and AL2 in FIG. 3. For example, in a case where the vehicle 10 moves forward, the vehicle exterior information detection unit 141 focuses on processing for detecting obstacles in the regions AF1, AF2, AF3, AR1, and AL1 in FIG. 3. Therefore, the region where the obstacle detection processing is focused on after the vehicle 10 stops near the edge of the vehicle road is changed from that before the vehicle 10 stops near the edge of the vehicle road. The vehicle exterior information detection unit 141 supplies data indicating the result of the detection processing to the situation recognition unit 153 or the like.

In step S7, the action planning unit 162 determines whether or not the vehicle 10 needs to temporarily stop. For example, in a case where a user gets in the vehicle 10 after the vehicle 10 has joined the vehicle road, the action planning unit 162 determines that the vehicle 10 needs to temporarily stop. Furthermore, even in a case where all the users have already got in the vehicle 10 and no user gets in the vehicle 10 after the vehicle 10 has joined the vehicle road, when the vehicle 10 moves backward to enter the vehicle road, the vehicle 10 needs to change the traveling direction after entering the vehicle road. Therefore, the action planning unit 162 determines that the vehicle 10 needs to temporarily stop. In a case where it is determined that the vehicle 10 needs to temporarily stop, the procedure proceeds to step S8.

In step S8, the action planning unit 162 sets a traveling direction and a position where the vehicle 10 temporarily stops.

For example, in a case where a user gets in the vehicle 10 after the vehicle 10 has joined the vehicle road, the position where the vehicle 10 temporarily stops (vehicle stop position) is set to a position where the user easily and safely gets in the vehicle 10 and the vehicle 10 easily travels to the planned route (hereinafter, referred to as scheduled route) after the user has got vehicle 10. For example, the vehicle stop position is set on the basis of at least one of the scheduled route of the vehicle 10, a degree of road congestion, whether or not an obstacle exists, a position of the obstacle, traffic rules (for example, one-way traffic or the like), a current position of the user who gets in the vehicle 10, user's instructions, or the like. Then, the traveling direction of the vehicle 10 after the vehicle 10 has temporarily stopped is set on the basis of the direction of the vehicle 10 at the vehicle stop position.

Furthermore, for example, in a case where the vehicle 10 enters the vehicle road while moving backward and no user gets in the vehicle 10 after the vehicle 10 has joined the vehicle road, the traveling direction and the joining lane of the vehicle 10 are set so that the vehicle 10 easily joins the vehicle road and easily travels to the scheduled route after joining the vehicle road. For example, the traveling direction and the joining lane of the vehicle 10 are set on the basis of at least one of the scheduled route of the vehicle 10, a degree of road congestion, whether or not an obstacle exists, a position of the obstacle, traffic rules (for example, one-way traffic or the like), user's instructions, or the like. Then, the position (vehicle stop position) where the vehicle 10 temporarily stops is set according to the traveling direction and the joining lane of the vehicle 10.

Thereafter, the procedure proceeds to step S10.

On the other hand, for example, in a case where the vehicle 10 can travel along the scheduled route after entering the vehicle road in step S7, for example, in a case where the vehicle 10 enters the vehicle road while moving forward and no user gets in the vehicle 10 after the vehicle 10 has joined the vehicle road, the action planning unit 162 determines that the vehicle 10 does not need to temporarily stop, and the procedure proceeds to step S9.

In step S9, the action planning unit 162 sets the traveling direction and the joining lane. For example, the traveling direction and the joining lane of the vehicle 10 are set so that the vehicle 10 easily joins the vehicle road and easily travels to the scheduled route after joining the vehicle road. For example, the traveling direction and the joining lane of the vehicle 10 are set on the basis of at least one of the scheduled route of the vehicle 10, a degree of road congestion, whether or not an obstacle exists, a position of the obstacle, traffic rules (for example, one-way traffic or the like), user's instructions, or the like.

Thereafter, the procedure proceeds to step S10.

In step S10, the action planning unit 162 determines whether or not to cross the lane on the basis of the vehicle stop position, the joining lane, or the like set in step S8 or S9. In a case where it is determined to cross the lane, the procedure proceeds to step S11.

For example, in the example in FIG. 6, it is determined to cross the lane 302A, and the procedure proceeds to step S11. For example, in the example in FIG. 7, it is determined to cross the lane 322B, the procedure proceeds to step S11. For example, in the example in FIG. 8, it is determined to cross the lane 342A, and the procedure proceeds to step S11.

In step S11, the situation recognition unit 153 determines whether or not visibility in the lane to be crossed is high on the basis of the data from the vehicle exterior information detection unit 141. In a case where it is determined that the visibility in the lane to be crossed is poor, the procedure proceeds to step S13.

For example, in the example in FIG. 8, a vehicle 343 is parked on the right of the lane 342A where the vehicle 10 crosses, and a field of view from the vehicle 10 is blocked. Therefore, it is determined that the visibility in the lane to be crossed is poor, and the procedure proceeds to step S12.

In step S12, the situation recognition unit 153 determines whether or not the safety has been confirmed on the basis of the data from the vehicle exterior information detection unit 141. The determination processing in step S12 is repeatedly executed until it is determined that the safety has been confirmed. For example, in a case where there is no obstacle around the traveling direction of the vehicle 10 and there is no other approaching vehicle in the lane to be crossed, the situation recognition unit 153 determines that the safety has been confirmed, and the procedure proceeds to step S13.

In step S13, the vehicle 10 moves to a position where the field of view is opened. Specifically, the driving system control unit 107 controls the driving system 108 under the control of the operation control unit 135 and moves the vehicle 10 to the position where the field of view is opened. Thereafter, the driving system control unit 107 temporarily stops the vehicle 10.

For example, in the example in FIG. 8, as illustrated in B of FIG. 8, the vehicle 10 automatically moves so that the rear end of the vehicle 10 is positioned near the left end (upper end in figure) of a vehicle 343 or on the slightly front side (upper side in figure) of the left end of the vehicle 343. As a result, the field of view from the vehicle 10 is not blocked by the vehicle 343, and the field of view to the right side of the lanes 342A and 342B is opened.

Thereafter, the procedure proceeds to step S14.

On the other hand, in a case where it is determined in step S11 that the visibility in the lane to be crossed is high, the processing in steps S12 and S13 is skipped, and the procedure proceeds to step S14.

Furthermore, in a case where it is determined in step S10 not to cross the lane, the processing in steps S11 to S13 is skipped, the procedure proceeds to step S14.

In step S14, the situation recognition unit 153 determines whether or not the safety has been confirmed on the basis of the data from the vehicle exterior information detection unit 141. The determination processing in step S12 is repeatedly executed until it is determined that the safety has been confirmed. For example, in a case where there is no obstacle around the traveling direction of the vehicle 10 and there is no other approaching vehicle in the vehicle road, the situation recognition unit 153 determines that the safety has been confirmed, and the procedure proceeds to step S15.

In step S15, the vehicle 10 joins the joining lane. Specifically, the driving system control unit 107 controls the driving system 108 under the control of the operation control unit 135 and makes the vehicle 10 automatically join the joining lane so as to travel in the traveling direction set in the processing in step S8 or S9.

For example, in the example in FIG. 6, the vehicle 10 joins the lane 302B. For example, in the example in FIG. 7, as illustrated in C of FIG. 7, the vehicle 10 joins the lane 322C. For example, in the example in FIG. 8, as illustrated in C of FIG. 8, the vehicle 10 joins the lane 342B.

In step S16, the action planning unit 162 determines whether or not to temporarily stop the vehicle 10. In a case where it is determined not to temporarily stop the vehicle 10, the procedure proceeds to step S17.

In step S17, the notification unit 211 turns off the notification function under the control of the notification control unit 201. For example, in a case where the notification unit 211 includes the hazard indicators, the hazard indicators stop blinking.

In step S18, the vehicle 10 travels in the traveling direction. For example, the driving system control unit 107 controls the driving system 108 under the control of the operation control unit 135 and makes the vehicle 10 automatically travel in the traveling direction.

Thereafter, the processing ends.

On the other hand, in a case where it is determined in step S16 to temporarily stop the vehicle 10, the procedure proceeds to step S19.

In step S19, the vehicle 10 temporarily stops. Specifically, the driving system control unit 107 controls the driving system 108 under the control of the operation control unit 135 and makes the vehicle 10 stop at the stop position set in the processing in step S8.

In step S20, the notification function is turned off as in the processing in step S17.

Thereafter, the processing ends.

As described above, in a case where the vehicle 10 moves from the parking position through automatic driving and joins the vehicle road, the notification by the hazard indicator is issued to the surroundings. Furthermore, the vehicle 10 temporarily stops near the boundary between sections of the road. Moreover, the region where an obstacle is mainly detected is switched according to the position of the vehicle 10. As a result, the vehicle 10 is prevented from colliding or contacting with a vehicle, a person, or the like around the vehicle 10, and it is possible to safely move the vehicle 10 from the parking position to the vehicle road and to make the vehicle 10 join the vehicle road.

2. Modification

A modification of the embodiment of the present technology described above will be described below.

Figure 9:
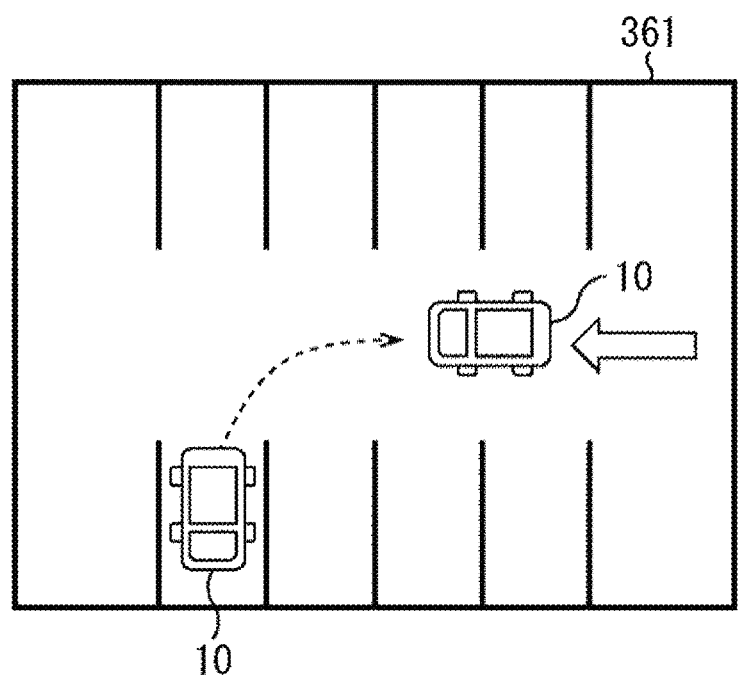
FIG. 9 is a diagram illustrating an example of the unloading processing.

In the above, an example has been described in which the vehicle 10 moves from the parking position and joins the vehicle road. However, the present technology can be applied to a case where the vehicle 10 moves from the parking position and joins a vehicle traffic region other than the vehicle road. For example, as illustrated in FIG. 9, the present technology can be applied to a case where the vehicle 10 moves from a parking position in a parking lot 361 and joins a region where vehicles travel.

Furthermore, for example, the vehicle 10 may continue automatic driving after joining the vehicle road or the vehicle traffic region or may stop automatic driving and operate by user's driving. In the latter case, driving assistance is applied until the vehicle joins the vehicle road or the vehicle traffic region.

Moreover, the notification to the surroundings at the time when the vehicle 10 is unloaded may be issued according to a method other than the hazard indicator. For example, the notification to the surroundings may be issued using a lamp other than the hazard indicators. Furthermore, for example, the notification to the surroundings may be issued using sound such as voice announcement, warning sound, or the like.

3. Others

<Exemplary Configuration of Computer>

The above-mentioned series of processing can be performed by hardware and software. In a case where the series of processing is performed by the software, a program included in the software is installed in a computer. Here, the computer includes a computer incorporated in dedicated hardware and, for example, a general personal computer or the like which can perform various functions by installing various programs.

FIG. 9 is a block diagram illustrating an exemplary configuration of hardware of the computer for executing the above-mentioned series of processing by the program.

In a computer 500, a Central Processing Unit (CPU) 501, a Read Only Memory (ROM) 502, and a Random Access Memory (RAM) 503 are connected to each other with a bus 504.

In addition, an input/output interface 505 is connected to the bus 504. An input unit 506, an output unit 507, a recording unit 508, a communication unit 509, and a drive 510 are connected to the input/output interface 505.

The input unit 506 includes an input switch, a button, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable medium 511 such as a magnetic disk, an optical disk, an optical magnetic disk, or a semiconductor memory.

In the computer 500 configured as described above, for example, the CPU 501 loads a program recorded in the recording unit 508 to the RAM 503 via the input/output interface 505 and the bus 504 and executes the program so that the above-mentioned series of processing is executed.

The program executed by the computer 500 (CPU 501) can be, for example, provided by recording the program to the removable medium 511 as a package media and the like. Furthermore, the program can be provided via a wired or wireless transmission medium such as a local area network, the Internet, and digital satellite broadcasting.

In the computer 500, the program can be installed to the recording unit 508 via the input/output interface 505 by mounting the removable medium 511 in the drive 510. Furthermore, the program can be received by the communication unit 509 via the wired or wireless transmission medium and installed to the recording unit 508. In addition, the program can be previously installed to the ROM 502 and the recording unit 508.

Note that, the program performed by the computer may be a program in which processing is executed along the order described herein in a time series manner and a program in which the processing is executed in parallel or at a necessary timing, for example, when a call has been performed.

Furthermore, a system means herein an assembly of a plurality of components (devices, modules (parts), and the like), and it is not considered whether or not all the components are in the same housing. Therefore, both of a plurality of devices respectively housed in different housings from each other and connected via the network and a single device having a plurality of modules housed in one housing are systems.

Moreover, the embodiment of the present technology is not limited to the above-mentioned embodiments, and various changes can be made without departing from the scope of the present technology.

For example, the present technology may have a configuration of cloud computing in which a single function is separately performed by a plurality of devices via a network in cooperation.

Furthermore, each step described with reference to the above-mentioned flowchart can be performed by a single device or can be divided and performed by a plurality of devices.

Moreover, in a case where a plurality of kinds of processing is included in one step, the plurality of kinds of processing included in one step can be executed by a single device or can be divided and executed by a plurality of devices.

<Example of Combination of Configurations>

The present technology can have the following configurations.

(1)

A vehicle control device including:
  a notification control unit configured to control a notification to surroundings in a case where a vehicle moves from a parking position; and
  an operation control unit configured to automatically move the vehicle from the parking position to make the vehicle join a vehicle traffic region and temporarily stop the vehicle before the vehicle enters the vehicle traffic region.

(2)

The vehicle control device according to (1), in which
  the operation control unit temporarily stops the vehicle near an edge of a vehicle road that is the vehicle traffic region.

(3)

The vehicle control device according to (2), further including:
  a vehicle exterior information detection unit configured to change a region where processing for detecting an obstacle is focused on after the vehicle stops near the edge of the vehicle road from that before the vehicle stops near the edge of the vehicle road.

(4)

The vehicle control device according to (3), in which
  in a case where safety is confirmed in a state where the vehicle is stopped near the edge of the vehicle road, the operation control unit makes the vehicle enter the vehicle road.

(5)

The vehicle control device according to (4), in which
  in a case where a second lane exists between a first lane of the vehicle road to which the vehicle joins and the vehicle and visibility in the second lane is poor, the operation control unit temporarily stops the vehicle near a position where a field of view in the second lane is opened.

(6)

The vehicle control device according to (5), in which
  in a case where safety is confirmed in a state where the vehicle is stopped near the position on the second lane where the field of view is opened, the operation control unit makes the vehicle join the first lane.

(7)

The vehicle control device according to any one of (2) to (6), in which
  in a case where a sidewalk exists between the vehicle road and the vehicle, the operation control unit temporarily stops the vehicle near an edge of the sidewalk.

(8)

The vehicle control device according to (7), further including:
  a vehicle exterior information detection unit configured to change a region where processing for detecting an obstacle is focused on after the vehicle stops near the edge of the sidewalk from that before the vehicle stops near the edge of the sidewalk.

(9)

The vehicle control device according to (8), in which
  in a case where safety is confirmed in a state where the vehicle is stopped near the edge of the sidewalk, the operation control unit makes the vehicle enter the sidewalk.

(10)

The vehicle control device according to any one of (2) to (9), in which
  the operation control unit temporarily stops the vehicle near a boundary between sections of a road including the vehicle road.

(11)

The vehicle control device according to any one of (1) to (10), further including:
  a planning unit configured to set a traveling direction of the vehicle in the vehicle traffic region, in which
  the operation control unit makes the vehicle join the vehicle traffic region so that the vehicle travels in the set traveling direction.

(12)

The vehicle control device according to (11), in which
  the planning unit sets the traveling direction of the vehicle on the basis of at least one of a scheduled route of the vehicle, a congestion degree of the vehicle traffic region, whether or not an obstacle exists, a position of an obstacle, traffic rules in the vehicle traffic region, a current position of a user who gets in the vehicle, or a user's instruction.

(13)

The vehicle control device according to (11) or (12), in which
  the planning unit sets a vehicle stop position after the vehicle joins the vehicle traffic region on the basis of at least one of the scheduled route of the vehicle, the congestion degree of the vehicle traffic region, whether or not an obstacle exists, a position of an obstacle, the traffic rules in the vehicle traffic region, the current position of the user who gets in the vehicle, or the user's instruction, and
  the operation control unit stops the vehicle at the vehicle stop position after making the vehicle join the vehicle traffic region.

(14)

The vehicle control device according to any one of (1) to (13), in which
  the notification control unit starts to issue the notification to the surroundings before the vehicle moves from the parking position.

(15)

The vehicle control device according to any one of (1) to (14), in which
  the notification control unit stops the notification to the surroundings after the vehicle has joined the vehicle traffic region.

(16)

The vehicle control device according to any one of (1) to (15), in which
  the notification control unit blinks hazard indicators of the vehicle.

(17)

A vehicle control method performed by a vehicle control device, the method including:
  controlling a notification to surroundings in a case where a vehicle moves from a parking position; and
  automatically moving the vehicle from the parking position to make the vehicle join a vehicle traffic region and temporarily stopping the vehicle before the vehicle enters the vehicle traffic region.

(18)

A program for causing a computer to execute processing including:
  controlling a notification to surroundings in a case where a vehicle moves from a parking position; and
  automatically moving the vehicle from the parking position to make the vehicle join a vehicle traffic region and temporarily stopping the vehicle before the vehicle enters the vehicle traffic region.

(19)

A vehicle including:
  a notification unit;
  a notification control unit configured to control a notification to surroundings by the notification unit in a case where the vehicle moves from a parking position;
  a driving unit; and
  an operation control unit configured to control the driving unit to automatically move the vehicle from the parking position to make the vehicle join a vehicle traffic region, and to temporarily stop the vehicle before the vehicle enters the vehicle traffic region.

Note that the effects described herein are only exemplary and not limited to these. There may be an additional effect.

REFERENCE SIGNS LIST

10 Vehicle
100 Vehicle control system
109 Body system control unit
110 Body system
107 Driving system control unit
108 Driving system
112 Automatic driving control unit
131 Detection unit
132 Self-position estimation unit
133 Situation analysis unit
134 Planning unit
135 Operation control unit
141 Vehicle exterior information detection unit
143 Vehicle state detection unit
153 Situation recognition unit
161 Route planning unit
162 Action planning unit
163 Operation planning unit
201 Notification control unit
211 Notification unit

The invention claimed is:
1. A vehicle control device comprising:
  a plurality of sensors to sense external conditions in regions surrounding a vehicle, each sensor performing sensing for one of the regions, the sensors including at least two different types of sensors; and circuitry configured to
control, based on sensing results from the plurality of sensors, a notification to surroundings external to the vehicle in a case where the vehicle moves from a parking position; and
automatically move the vehicle from the parking position to make the vehicle join a vehicle traffic region and temporarily stop the vehicle before the vehicle enters the vehicle traffic region.

2. The vehicle control device according to claim 1, wherein the circuitry temporarily stops the vehicle near an edge of a vehicle road that is the vehicle traffic region.

3. The vehicle control device according to claim 2, wherein the circuitry is further configured to change a region where processing for detecting an obstacle is focused on after the vehicle stops near the edge of the vehicle road from that before the vehicle stops near the edge of the vehicle road.

4. The vehicle control device according to claim 3, wherein in a case where safety is confirmed in a state where the vehicle is stopped near the edge of the vehicle road, the circuitry makes the vehicle enter the vehicle road.

5. The vehicle control device according to claim 4, wherein in a case where a second lane exists between a first lane of the vehicle road to which the vehicle joins and the vehicle and visibility in the second lane is poor, the circuitry temporarily stops the vehicle near a position where a field of view in the second lane is opened.

6. The vehicle control device according to claim 5, wherein in a case where safety is confirmed in a state where the vehicle is stopped near the position on the second lane where the field of view is opened, the circuitry makes the vehicle join the first lane.

7. The vehicle control device according to claim 2, wherein in a case where a sidewalk exists between the vehicle road and the vehicle, the circuitry temporarily stops the vehicle near an edge of the sidewalk.

8. The vehicle control device according to claim 7, wherein the circuitry is further configured to change a region where processing for detecting an obstacle is focused on after the vehicle stops near the edge of the sidewalk from that before the vehicle stops near the edge of the sidewalk.

9. The vehicle control device according to claim 8, wherein in a case where safety is confirmed in a state where the vehicle is stopped near the edge of the sidewalk, the circuitry makes the vehicle enter the sidewalk.

10. The vehicle control device according to claim 2, wherein the circuitry temporarily stops the vehicle near a boundary between sections of a road including the vehicle road.

11. The vehicle control device according to claim 1, wherein the circuitry is further configured to:
set a traveling direction of the vehicle in the vehicle traffic region, and
make the vehicle join the vehicle traffic region so that the vehicle travels in the set traveling direction.

12. The vehicle control device according to claim 11, wherein the circuitry sets the traveling direction of the vehicle on a basis of at least one of a scheduled route of the vehicle, a congestion degree of the vehicle traffic region, whether or not an obstacle exists, a position of an obstacle, traffic rules in the vehicle traffic region, a current position of a user who gets in the vehicle, or a user's instruction.

13. The vehicle control device according to claim 11, wherein
the circuitry a vehicle stop position after the vehicle joins the vehicle traffic region on a basis of at least one of the scheduled route of the vehicle, the congestion degree of the vehicle traffic region, whether or not an obstacle exists, a position of an obstacle, the traffic rules in the vehicle traffic region, the current position of the user who gets in the vehicle, or the user's instruction, and
the circuitry stops the vehicle at the vehicle stop position after making the vehicle join the vehicle traffic region.

14. The vehicle control device according to claim 1, wherein the circuitry starts to issue the notification to the surroundings before the vehicle moves from the parking position.

15. The vehicle control device according to claim 1, wherein circuitry stops the notification to the surroundings after the vehicle has joined the vehicle traffic region.

16. The vehicle control device according to claim 1, wherein the circuitry blinks hazard indicators of the vehicle.

17. The vehicle control device according to claim 1, wherein the circuitry is further configured to set the traveling direction of the vehicle based at least on the sensing results from the plurality of sensors.

18. A vehicle control method performed by a vehicle control device, the method comprising:
receiving sensing results from a plurality of sensors that sense external conditions in regions surrounding a vehicle, each sensor performing sensing for one of the regions, the sensors including at least two different types of sensors;
controlling, based on the sensing results, a notification to surroundings in a case where the vehicle moves from a parking position; and
automatically moving the vehicle from the parking position to make the vehicle join a vehicle traffic region and temporarily stopping the vehicle before the vehicle enters the vehicle traffic region.

19. A non-transitory computer-readable medium encoded with computer-readable instructions that, when executed by processing circuitry, cause the processing circuitry to perform a method comprising:
receiving sensing results from a plurality of sensors that sense external conditions in regions surrounding a vehicle, each sensor performing sensing for one of the regions, the sensors including at least two different types of sensors;
controlling, based on the sensing results, a notification to surroundings external to the vehicle in a case where the vehicle moves from a parking position; and
automatically moving the vehicle from the parking position to make the vehicle join a vehicle traffic region and temporarily stopping the vehicle before the vehicle enters the vehicle traffic region.

20. A vehicle comprising:
a plurality of sensors to sense external conditions in regions surrounding the vehicle, each sensor performing sensing for one of the regions, the sensors including at least two different types of sensors; and
circuitry configured to
control, based on sensing results from the plurality of sensors, a notification to surroundings external to the vehicle in a case where the vehicle moves from a parking position; and
control the vehicle to automatically move from the parking position to make the vehicle join a vehicle traffic region, and temporarily stop the vehicle before the vehicle enters the vehicle traffic region.

* * * * *